(12) United States Patent
Kasada

(10) Patent No.: US 9,530,444 B2
(45) Date of Patent: *Dec. 27, 2016

(54) MAGNETIC RECORDING MEDIUM

(71) Applicant: FUJIFILM Corporation, Minato-ku, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/209,065

(22) Filed: Mar. 13, 2014

(65) Prior Publication Data

US 2014/0272474 A1 Sep. 18, 2014

(30) Foreign Application Priority Data

Mar. 15, 2013 (JP) ................................. 2013-053543

(51) Int. Cl.
*G11B 5/706* (2006.01)
*G11B 5/708* (2006.01)
*G11B 5/70* (2006.01)

(52) U.S. Cl.
CPC ........... *G11B 5/7085* (2013.01); *G11B 5/7013* (2013.01); *G11B 5/70678* (2013.01)

(58) Field of Classification Search
None
See application file for complete search history.

(56) References Cited

U.S. PATENT DOCUMENTS

| 4,425,404 | A | * | 1/1984 | Suzuki et al. | ................ | 428/341 |
| 5,242,752 | A | * | 9/1993 | Isobe et al. | .................. | 428/329 |
| 5,496,607 | A | | 3/1996 | Inaba et al. | | |
| 6,686,022 | B2 | | 2/2004 | Takano et al. | | |
| 2002/0122339 | A1 | | 9/2002 | Takano et al. | | |
| 2007/0020490 | A1 | * | 1/2007 | Harasawa | ............ | G11B 5/7085 |
| | | | | | | 428/842.8 |

(Continued)

FOREIGN PATENT DOCUMENTS

JP 05-258283 A 10/1993
JP 05-298653 A 11/1993

(Continued)

OTHER PUBLICATIONS

English Machine Translation: Tetsukawa et al. (JP 2002-329605).*
Office Action dated Jan. 27, 2015 from the Japanese Patent Office in counterpart Japanese Application No. 2013-053543.

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises a magnetic layer comprising ferromagnetic powder and binder on a nonmagnetic support, wherein the ferromagnetic powder is ferromagnetic hexagonal ferrite powder comprising 3 to 12 weight percent of Al, based on $Al_2O_3$ conversion, relative to 100 weight percent of a total weight of the powder, the magnetic layer further comprises abrasive, and a maximum plan view surface area of the abrasive as determined for a 4.3 μm×6.3 μm rectangular region of the magnetic layer by a scanning electron microscope is less than 0.06 percent relative to 100 percent of a total surface area of the region.

7 Claims, 1 Drawing Sheet

(56) References Cited

U.S. PATENT DOCUMENTS

| | | | |
|---|---|---|---|
| 2008/0297950 A1* | 12/2008 | Noguchi | G11B 5/00821 360/313 |
| 2010/0246073 A1* | 9/2010 | Katayama | G11B 5/7085 360/324 |
| 2011/0052908 A1* | 3/2011 | Imaoka | G11B 5/70 428/336 |
| 2011/0244272 A1* | 10/2011 | Suzuki et al. | 428/842.8 |
| 2012/0177951 A1* | 7/2012 | Yamazaki | H01F 1/11 428/842.8 |
| 2012/0183811 A1* | 7/2012 | Hattori | G11B 5/712 428/836 |
| 2012/0243120 A1 | 9/2012 | Harasawa et al. | |
| 2012/0244387 A1* | 9/2012 | Mori | G11B 5/70678 428/842.8 |
| 2013/0260179 A1* | 10/2013 | Kasada | G11B 5/7085 428/840.2 |
| 2014/0011055 A1 | 1/2014 | Suzuki et al. | |

FOREIGN PATENT DOCUMENTS

| | | | | |
|---|---|---|---|---|
| JP | 07-057242 A | 3/1995 | | |
| JP | 2002-157726 A | 5/2002 | | |
| JP | 2002329605 A | * 11/2002 | | H01F 1/11 |
| JP | 2007-273039 A | 10/2007 | | |
| JP | 2011-225417 A | 11/2011 | | |

\* cited by examiner

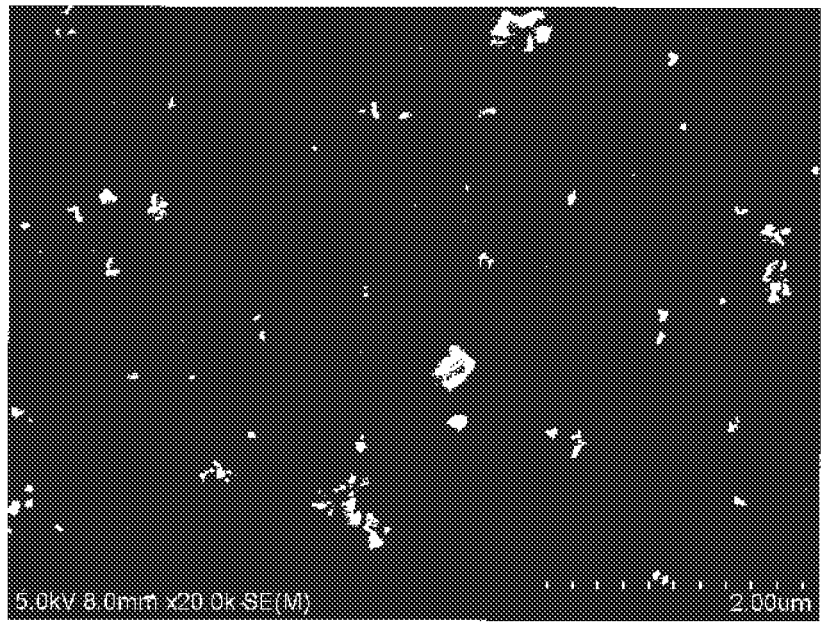
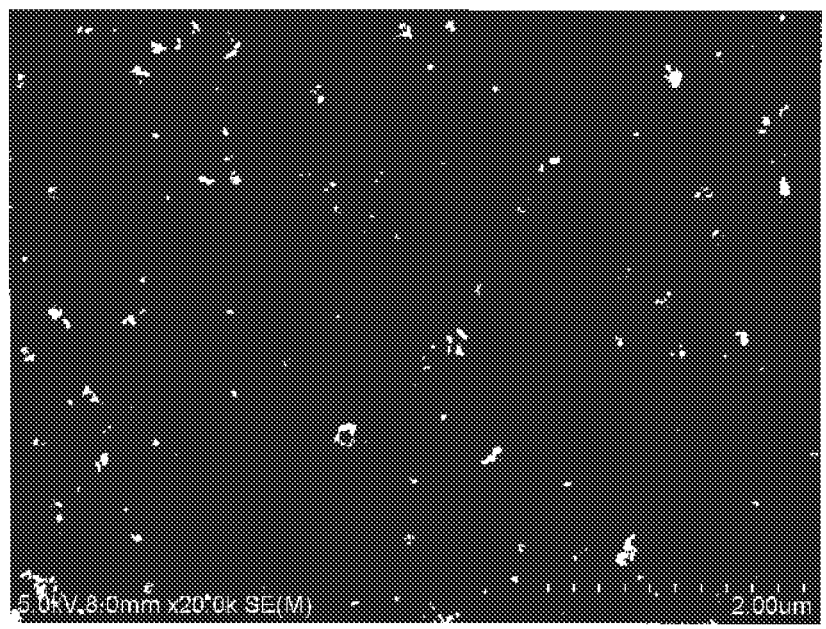

MAGNETIC RECORDING MEDIUM

CROSS-REFERENCE TO RELATED APPLICATIONS

This application claims the benefit of priority under 35 USC 119 to Japanese Patent Application No. 2013-053543 filed on Mar. 15, 2013, which is expressly incorporated herein by reference in its entirety.

BACKGROUND OF THE INVENTION

Field of the Invention

The present invention relates to a magnetic recording medium and to a method of manufacturing the same. More particularly, the present invention relates to a magnetic recording medium capable of affording both good electromagnetic characteristics and running durability, as well as running stability; and to a method of manufacturing the same.

Discussion of the Background

Known magnetic recording media include particulate magnetic recording media, which comprise a magnetic layer fabricated by coating on a nonmagnetic support a magnetic coating material prepared by dispersing ferromagnetic powder and binder in a solvent, and metal thin-film type magnetic recording media, in which a film of ferromagnetic powder is formed on a nonmagnetic support. From the perspectives of productivity and general utility, particulate magnetic recording media are known to be superior.

To prevent foreign matter from adhering to the head during recording and reproduction and thus compromising running durability in particulate magnetic recording media, abrasives are widely employed as magnetic layer components (for example, see Japanese Unexamined Patent Publication (KOKAI) No. 2002-157726 or English language family members US2002/122339A1 and U.S. Pat. No. 6,686,022, which are expressly incorporated herein by reference in their entirety).

SUMMARY OF THE INVENTION

As set forth above, abrasives are components that can contribute to enhancing the running durability of a particulate magnetic recording medium. However, there are also cases where abrasives may produce phenomena such as decreasing the running stability and running durability through head abrasion, and lower the SNR by increasing noise. In that regard, Japanese Unexamined Patent Publication (KOKAI) No. 2002-157726 proposes specifying the state in which the abrasive is present in the magnetic layer to achieve both electromagnetic characteristics and running durability.

However, even better electromagnetic characteristics have been demanded of magnetic recording media in recent years. The technique described in the above publication does not adequately satisfy such requirements while maintaining running stability. Further improvement is needed.

An aspect of the present invention provides for a magnetic recording medium simultaneously affording good electromagnetic characteristics, running durability, and running stability.

The present inventor conducted extensive research. As a result, he discovered that by incorporating abrasive in the form of much finer particles than have conventionally been the case into the magnetic layer, it was possible to achieve the even better electromagnetic characteristics that have been demanded in recent years in addition to good running stability. However, it became clear that it was difficult to obtain adequate running durability in a magnetic layer comprising extremely fine particles of abrasive. Head grime that occurred due to shavings from the medium surface, metal salts derived from lubricants, and the like diminished running durability as the reproduction head slide against the magnetic recording medium. Abrasives are a component that can function by contributing to the polishing capability (cleaning property) by removing such head grime from the surface of the magnetic layer. However, when extremely fine particles of abrasive are incorporated into the magnetic layer to further enhance electromagnetic characteristics, the conventional capability of the abrasive to polish the magnetic layer is thought to be inadequate. The present inventor presumed that this was the reason for the above drop in running durability.

Accordingly, the present inventor conducted further extensive research to discover a means of enhancing running durability in magnetic recording medium having a magnetic layer in which extremely fine particles of abrasive were present. As a result, he made the novel discovery that by employing ferromagnetic hexagonal ferrite powder containing a prescribed quantity of Al as the ferromagnetic powder in the magnetic layer, it was possible to enhance the running durability of the magnetic recording medium in which abrasive was present in the magnetic layer in the form of extremely fine particles. The present inventor presumed that this occurred because the ferromagnetic hexagonal ferrite powder containing a prescribed quantity of Al could play the role of an abrasive. Incorporating such ferromagnetic hexagonal ferrite powder was also thought to contribute to enhancing the running stability by increasing the film strength of the magnetic layer.

The present invention was devised on the basis of the above discoveries.

An aspect of the present invention relates to:

a magnetic recording medium, which comprises a magnetic layer comprising ferromagnetic powder and binder on a nonmagnetic support, wherein the ferromagnetic powder is ferromagnetic hexagonal ferrite powder comprising 3 weight percent to 12 weight percent of Al, based on $Al_2O_3$ conversion, relative to 100 weight percent of a total weight of the powder, the magnetic layer further comprises abrasive, and a maximum plan view surface area of the abrasive as determined for a 4.3 μm×6.3 μm rectangular region of the magnetic layer by a scanning electron microscope is less than 0.06 percent relative to 100 percent of a total surface area of the region.

In an embodiment, the specific surface area of the abrasive by BET method ranges from 14 $m^2/g$ to 40 $m^2/g$.

In an embodiment, the abrasive is alumina.

In an embodiment, the magnetic layer comprises an aromatic hydrocarbon compound comprising at least one phenolic hydroxyl group.

In an embodiment, the aromatic hydrocarbon compound comprising at least one phenolic hydroxyl group is denoted by formula (1) below:

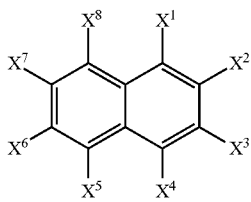

(1)

wherein, in formula (1), two from among $X^1$ to $X^8$ denote hydroxyl groups and each of the others from among $X^1$ to $X^8$ independently denotes a hydrogen atom or a substituent.

In an embodiment, the aromatic hydrocarbon compound comprising at least one phenolic hydroxyl group is selected from the group consisting of dihydroxynaphthalene and derivatives thereof.

In an embodiment, Al adheres to a surface of the ferromagnetic hexagonal ferrite powder.

In an embodiment, the ferromagnetic hexagonal ferrite powder is ferromagnetic hexagonal ferrite powder comprising more than 8 weight percent and equal to or less than 12 weight percent of Al, based on $Al_2O_3$ conversion, relative to 100 weight percent of a total weight of the powder.

In an embodiment, the ferromagnetic hexagonal ferrite powder is ferromagnetic hexagonal ferrite powder that has been obtained by glass crystallization method using a mixture of starting materials comprising Al.

A further aspect of the present invention relates to:

a method of manufacturing the above magnetic recording medium, which comprises:

preparing a coating material for forming a magnetic layer by mixing:

a magnetic liquid comprising an organic solvent and ferromagnetic hexagonal ferrite powder containing 3 weight percent to 12 weight percent of Al, based on $Al_2O_3$ conversion, relative to 100 weight percent of the total weight of the powder, and an abrasive liquid comprising abrasive, an organic solvent, and an aromatic hydrocarbon compound comprising at least one phenolic hydroxyl group (but comprising substantially no ferromagnetic hexagonal ferrite powder); and coating on a nonmagnetic support the coating material for forming the magnetic layer that has been prepared to form a magnetic layer.

In an embodiment, the abrasive is alumina.

An aspect of the present invention can provide a magnetic recording medium affording good electromagnetic characteristics and running durability, as well as good running stability.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the FIGURE, wherein:

The upper portion of FIG. 1 is a SEM binary-processed image of Comparative Example 1 and the lower portion is the same of Example 1.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to:

a magnetic recording medium, which comprises a magnetic layer comprising ferromagnetic powder and binder on a nonmagnetic support, wherein the ferromagnetic powder is ferromagnetic hexagonal ferrite powder comprising 3 weight percent to 12 weight percent of Al, based on $Al_2O_3$ conversion, relative to 100 weight percent of a total weight of the powder, the magnetic layer further comprises abrasive, and a maximum plan view surface area of the abrasive as determined for a 4.3 μm×6.3 μm rectangular region of the magnetic layer by a scanning electron microscope is less than 0.06 percent relative to 100 percent of a total surface area of the region.

In the magnetic recording medium according to an aspect of the present invention, the incorporation into the magnetic layer of abrasive in the form of extremely fine particles as set forth above can further enhance electromagnetic characteristics. Incorporating Al-containing ferromagnetic hexagonal ferrite powder as the ferromagnetic powder of the magnetic layer can develop good running durability as well as good running stability. The reasons for this are as set forth above.

The magnetic recording medium according to an aspect of the present invention will be described in greater detail below.

State in which the Abrasive is Present in the Magnetic Layer

In the magnetic recording medium according to an aspect of the present invention, the abrasive is present in the magnetic layer in a state such that the maximum plan view surface area of the abrasive as determined for a region 4.3 μm high×6.3 μm long of the magnetic layer by a scanning electron microscope is less than 0.06 percent of the 100 percent total surface area of the region. In a coarser state accounting for equal to or more than 0.06 percent of the plan view surface area of the 100 percent total surface area of the region, the magnetic recording medium comprising the magnetic layer in which the abrasive is present ends up undergoing the phenomena of increased head abrasion and decreased running stability and electromagnetic characteristics. By contrast, a magnetic recording medium in which the abrasive is present in the magnetic layer in the form of extremely fine particles of less than 0.06 percent of 100 percent of the total surface area of the above region will exhibit good running durability, for example, as indicated in Examples further below.

In the present invention, the maximum plan view surface area of the abrasive serving as an indicator of the state in which the abrasive is present in the magnetic layer is determined from a scanning electron microscope photograph (SEM image) taken by a scanning electron microscope (FE-SEM) under conditions of an accelerating voltage of 5 kV and a working distance (W.D.) of 8 mm at an image pickup magnification of 20,000-fold. The specific procedure is given below.

1. Obtaining an SEM Image

A scanning electron microscope (FE-SEM) in the form of an FE-SEM 54800 made by Hitachi is employed. With no coating processing prior to image pickup, the accelerating voltage is set to 5 kV, the working distance (W.D.) to 8 mm, the image pickup magnification to 20,000-fold, and the probe current to normal to obtain a secondary electron image.

2. Image Analysis

Analysis is conducted by the following procedure using WinROOF from Mitani Corporation as the image analysis software. The surface area is obtained as pixels.

(1) The image data (SEM (20 K) jpg image) of the SEM image obtained in 1. above is dragged and dropped into WinROOF.

(2) On the image, excluding portions on which the magnification and scale are displayed, a region 4.3 μm high×6.3 μm long is selected as the analysis region.

(3) The analysis region is binary processed. Specifically, a lower limit of 150 gradations and an upper limit of 255 gradations are selected and binary processing is conducted based on these two thresholds.

(4) Based on the binary processing, the surface area of the various portions that shine white within the analysis region is determined. Specifically, the image analysis software executes measurement→shape characteristics→surface area.

(5) The ratio of the surface area of the various portions calculated in (4) to the total surface area (4.3 μm×6.3 μm) of the analysis region is calculated.

(6) The procedure of (2) to (5) above is implemented four times, N=4, changing the position of the analysis region.

(7) The average value of the maximum values measured in four rounds is calculated and this value is adopted as the maximum plan view surface area of the abrasive.

In obtaining a magnetic layer in which the abrasive is present in the form of extremely fine particles, the aggregation of abrasive in the form of small particles is desirably inhibited and these particles are desirably uniformly dispersed in the magnetic layer without causing them to be unevenly distributed. One means of achieving this is to intensify the dispersion conditions. For example, separately dispersing the abrasive from the ferromagnetic powder is one way of intensifying the dispersion conditions. More specifically, this separate dispersion is a method such that an abrasive liquid containing abrasive and solvent (but substantially containing no ferromagnetic powder) is mixed with a magnetic liquid containing ferromagnetic powder, solvent, and binder to prepare a coating material for forming the magnetic layer. Mixing an abrasive and ferromagnetic powder that have been separately dispersed in this manner makes it possible to enhance dispersion of the abrasive in the coating material for forming the magnetic layer. The phrase "substantially containing (or comprising) no ferromagnetic powder" means that none is added as a constituent component of the abrasive liquid, but the presence of trace quantities of ferromagnetic powder as unintended impurities is permissible. Instead of separate dispersion, or in combination with separate dispersion, means such as using a small-diameter dispersion medium, packing a larger amount of the dispersion medium into the dispersing apparatus, conducting powerful dispersion for an extended period, or the like can be optionally combined to intensify the dispersion conditions. The use of a dispersing agent is also an effective means. Dispersing agents will be discussed further below.

The use of an abrasive in the form of an extremely small-diameter abrasive is desirable to obtain a magnetic layer in which abrasive is present in the form of extremely fine particles. For example, the specific surface area is an indicator of the size of the abrasive particles. The larger the specific surface area, the smaller the size of the particles. In an aspect of the present invention, abrasive with fine particles with a specific surface area ($S_{BET}$) as measured by the BET method of equal to or higher than 14 m$^2$/g is desirably employed. From the perspective of dispersion, an abrasive with an $S_{BET}$ of equal to or less than 40 m$^2$/g is desirably employed.

As set forth above, incorporating an abrasive in the form of extremely fine particles may lower the polishing capability (cleaning property) to which the abrasive contributes in the magnetic layer than the conventional magnetic layer. In such a magnetic layer, developing the polishing capability of the abrasive is desirable for obtaining a magnetic recording medium exhibiting even better running durability.

From the above perspective, it is desirable to employ an inorganic powder with a Mohs hardness of greater than 8, and preferable an inorganic powder with a Mohs hardness of equal to or greater than 9, as the abrasive. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. The alumina being referred to is a powder comprised chiefly of aluminum oxide. Alumina comes primarily in the two crystalline forms of alpha and gamma, either of which can be employed as the alumina in the particulate magnetic recording medium. Alumina of the alpha crystalline form (α-alumina), which is hard and can contribute to the polishing property and enhance the coating strength is desirably employed. The ratio of the alpha form in the α-alumina is desirably equal to or greater than 50 percent from the perspective of hardness. These forms of alumina can both be prepared by known methods or obtained as commercial products. The above inorganic powder can be of any shape, such as acicular, spherical, or cubic. The presence of angular portions is desirable to enhance the polishing property.

To obtain a magnetic layer in which abrasive is present in the form of extremely fine particles, the use of a dispersing agent is effective. Among dispersing agents, an aromatic hydrocarbon compound comprising at least one phenolic hydroxyl group is one that will maintain good dispersion and dispersion stability of a fine particle abrasive, particularly fine particle alumina, in a coating material for forming the magnetic layer. The reason for this is not entirely clear. However, it is presumed that adsorption of the aromatic hydrocarbon compound comprising at least one phenolic hydroxyl group to active points on the alumina surface can contribute to enhancing dispersion and dispersion stability. In that regard, it is known that when alumina is subjected to dispersion processing, the surface pH changes from moment to moment. This has been attributed to crushing of the aluminum powder by the dispersion treatment, resulting in the formation of new active points on the surface. When the new active points adsorb to each other, aggregation of the alumina is promoted. By contrast, it is presumed that by causing aromatic hydrocarbon compounds comprising phenolic hydroxyl groups to adsorb to these active points, it is possible to prevent aggregation, permitting the stable dispersion of alumina to a high degree.

The term "phenolic hydroxyl group" refers to a hydroxyl group directly bonded to an aromatic ring. With regard to the use of aromatic hydrocarbon compounds comprising phenolic hydroxyl groups to prepare a coating material for forming the magnetic layer of a particulate magnetic recording medium, Japanese Unexamined Patent Publication (KOKAI) Heisei No. 3-292617, which is expressly incorporated herein by reference in its entirety, proposes dihydroxynaphthalene as a component that is capable of preventing the deterioration by oxidation of the ferromagnetic metal particles used in magnetic recording. However, the fact that aromatic hydrocarbon compounds comprising phenolic hydroxyl groups such as dihydroxynaphthalene are components that can contribute to enhancing the dispersion and dispersion stability of alumina has recently been discovered.

The aromatic ring contained in the aromatic hydrocarbon compound comprising at least one phenolic hydroxyl group can have a monocyclic or polycyclic structure, and can be a condensed ring. From the perspective of enhancing the dispersion and dispersion stability of the alumina, an aromatic hydrocarbon compound comprising at least one benzene ring or naphthalene ring is desirable. The aromatic hydrocarbon compound can comprise one or more substituents in addition to phenolic hydroxyl groups. From the perspective of ease of introduction into the compound and the like, examples of desirable substituents in addition to phenolic hydroxyl groups are halogen atoms, alkyl groups, alkoxy groups, amino groups, acyl groups, nitro groups, nitroso groups, and hydroxyalkyl groups. In terms of compounds comprising one or more substituents in addition to phenolic hydroxyl groups, those compounds having substituents exhibiting an electron donating property in the form of a Hammett substituent constant of equal to or lower than 0.4 tend to be advantageous for the dispersion of aluminum. Examples of substituents that are desirable in this regard are those with electron-donating properties as good as or better than those of halogen atoms, more specifically, halogen atoms, alkyl groups, alkoxy groups, amino groups, and hydroxyalkyl groups.

One, two, three, or more of the above phenolic hydroxyl groups contained in the aromatic hydrocarbon compound can be present. When the aromatic ring present in the aromatic hydrocarbon compound is a naphthalene ring, two or more phenolic hydroxyl groups are desirably contained. Two phenolic hydroxyl groups are preferred. That is, the compound denoted by formula (1) below is desirable as an aromatic hydrocarbon compound comprising an aromatic ring in the form of a naphthalene ring.

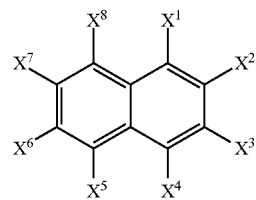

(In formula (1), two from among $X^1$ to $X^8$ denote hydroxyl groups, with each of the others independently denoting a hydrogen atom or substituent.)

The compound denoted by formula (1) is not specifically limited to two hydroxyl group (phenolic hydroxyl group) substitution sites.

In the compound denoted by formula (1), two from among $X^1$ to $X^8$ denote hydroxyl groups (phenolic hydroxyl groups), with each of the others independently denoting a hydrogen atom or a substituent. Of $X^1$ to $X^8$, all portions other than the two hydroxyl groups can be hydrogen atoms, or some or all of these portions can be substituents. Examples of these substituents are the substituents given by way of example above. Although phenolic hydroxyl groups can be contained as substituents in addition to the two hydroxyl groups, from the perspectives of dispersion and enhancing dispersion, they are desirably not phenolic hydroxyl groups. That is, the compound denoted by formula (1) is desirably a dihydroxynaphthalene or a derivative thereof. Among such compounds, 2,3-dihydroxynaphthalene or a derivative thereof is desirable. Examples of substituents that are desirable as the substituents denoted by $X^1$ to $X^8$ are substituents selected from the group consisting of halogen atoms (such as chlorine atoms and bromine atoms), amino groups, alkyl groups with 1 to 6 carbon atoms (desirably 1 to 4 carbon atoms), methoxy groups, ethoxy groups, acyl groups, nitro groups, nitroso groups, and —$CH_2OH$ groups.

The aromatic hydrocarbon compound comprising at least one aromatic ring in the form of a benzene ring desirably comprises one or more phenolic hydroxyl group, preferably one or two. Such aromatic hydrocarbon compounds can be denoted by formula (2) below:

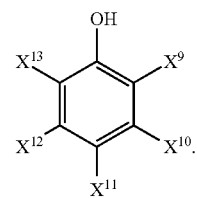

(In formula (2), each of $X^9$ to $X^{13}$ independently denotes a hydrogen atom or a substituent.)

All of $X^9$ to $X^{13}$ in formula (2) can denote hydrogen atoms, or some portion or the entirety thereof can denote substituents. Examples of substituents are phenolic hydroxyl groups and the substituents given by way of example above. Examples of desirable substituents are substituents selected from the group consisting of hydroxyl groups, carboxyl groups, and alkyl groups having 1 to 6 carbon atoms (preferably 1 to 4 carbon atoms).

Specific examples of desirable aromatic hydrocarbon compounds denoted by formula (2) are phenol, hydroxybenzoic acid, and derivatives thereof.

One aromatic hydrocarbon compound alone, or a combination of two or more, can be employed as the dispersing agent. Each of these aromatic hydrocarbon compounds can be synthesized by known methods or obtained as a commercial product.

When the abrasive liquid and the magnetic liquid are separately dispersed, the solvent that is employed to prepare the abrasive liquid is not specifically limited. When employing the above dispersing agent, a solvent that is capable of dissolving the dispersing agent well is desirably employed. From this perspective, an organic solvent is desirable. Among organic solvents, ketone solvents are preferred. Since ketone solvents are widely employed as solvents for coating materials for forming particulate magnetic recording media, they are suitable for preparing the abrasive liquid. Specific examples of ketone solvents are acetone, methyl ethyl ketone, methyl isobutyl ketone, and cyclohexanone. In addition to ketone solvents, it is possible to employ methanol, ethanol, isopropanol, toluene, xylene, ethyl benzene, ethyl formate, ethyl acetate, butyl acetate, dioxane, tetrahydrofuran, dimethyl formamide, and the like. Since the above dispersing agents are poorly soluble in water, the solvent is desirably not incorporated in the form of water alone.

The abrasive liquid contains abrasive, solvent, and desirably the above dispersing agent. It also desirably contains a resin component that is capable of functioning as a binder in the particulate magnetic recording medium. That is because a resin component can coat the surface of the abrasive, thereby further enhancing the dispersion and dispersion stability of the abrasive. From the above perspective, the use of a resin component that can adsorb well to the surface of the abrasive, particularly the use of a resin component having a functional group with polarity (polar group) to serve as the point of adsorption to the surface of the abrasive, is desirable. Examples of polar groups are sulfo groups, phosphoric acid groups, hydroxy groups, carboxyl groups, and salts thereof. A sulfo group, or salt thereof, with high adsorptive strength is desirable. To further enhance dispersion and dispersion stability, the quantity of polar groups in the resin component is desirably 50 meq/kg to 400 meq/kg, preferably 60 meq/kg to 330 meq/kg.

Various resins that are employed as binders in particulate magnetic recording media, such as polyurethane resins and vinyl chloride resins, can be employed as the resin component. Among these resins, from the perspective of the dispersion and dispersion stability of the abrasive, polyurethane resins are desirably employed. Among the polyurethane resins, polyether polyurethane and polyester polyurethane resins are suitably employed. The polyurethane resins are also desirable resin components from the perspective of good solubility in the ketone solvents being suitable solvents set forth above.

The abrasive liquid can be prepared by simultaneously or sequentially adding and dispersing the above components. For example, glass beads can be employed in dispersion. In addition to glass beads, a dispersion medium with a high specific gravity, such as zirconia beads, titania beads, steel beads, or alumina beads, are suitable. The particle diameter and fill rate of the dispersion media can be used to intensify the dispersion conditions. A known dispersion apparatus can be employed. When employing a dispersing agent, the use of proportions of 2 weight parts to 20 weight parts of dispersing agent, 150 weight parts to 970 weight parts of solvent, and 5 weight parts to 30 weight parts of resin component per 100 weight parts of abrasive is desirable to enhance the dispersion and dispersion stability of the abrasive and obtain a magnetic layer in which abrasive is present in the form of extremely fine particles.

Ferromagnetic Powder

The magnetic layer in which the above abrasive is present in the form of extremely fine particles contains ferromagnetic powder in the form of ferromagnetic hexagonal ferrite powder comprising 3 weight percent to 12 weight percent of Al, based on $Al_2O_3$ conversion, relative to 100 weight percent of the total weight of the powder. Incorporating Al can render the ferromagnetic hexagonal ferrite hard. Incorporating hardened particles, or such ferromagnetic hexagonal ferrite powder, can yield a magnetic layer of heightened strength such that when the surface thereof slides against the head, it can perform a polishing function. The present inventor has surmised that this can compensate for the inadequate polishing capability due to the presence of the abrasive in the form of extremely fine particles. However, in ferromagnetic hexagonal ferrite powder in which the Al content is less than 3 weight percent based on $Al_2O_3$ conversion, it is difficult to compensate for the inadequate polishing capability. There are also cases in which decreased running stability accompanies inadequate polishing capability. Additionally, in ferromagnetic hexagonal ferrite powder containing a large amount of Al in excess of 12 weight percent based on $Al_2O_3$ conversion, the polishing capability of the surface of the magnetic layer becomes excessive, imparting wear and tear to the head. Accordingly, ferromagnetic hexagonal ferrite powder containing 3 weight percent to 12 weight percent of Al based on $Al_2O_3$ conversion relative to 100 weight percent of the total weight is employed as the ferromagnetic powder contained in the magnetic layer in the present invention. From the perspective of maintaining the polishing capability of the magnetic layer, the greater the content of Al within the stated range the better. For example, equal to or more than 5 weight percent or equal to or more than 6 weight percent is desirable. Additionally, from the perspective of preventing head abrasion, the lower the content of Al within the stated range the better. For example, equal to or less than 10 weight percent is desirable and equal to or less than 8 weight percent is preferred. Japanese Unexamined Patent Publication (KOKAI) No. 2011-225417, which is expressly incorporated herein by reference in its entirety, described further below, describes ferromagnetic hexagonal ferrite powder containing Al. In that publication, the upper limit of the Al content is specified as equal to or less than 8 weight percent based on $Al_2O_3$ conversion. By contrast, in an aspect of the present invention, ferromagnetic hexagonal ferrite powder containing Al exceeding 8 weight percent based on $Al_2O_3$ conversion can be employed and is desirable. The fact that the presence of the abrasive in the form of fine particles permits the use of ferromagnetic hexagonal ferrite powder with an Al content in excess of 8 weight percent based on $Al_2O_3$ conversion cannot be derived from the above-cited publication, and was recently discovered by the present inventor.

The Al can be present within the particles of the ferromagnetic hexagonal ferrite powder, can adhere to the surface of the particles, or can be present both within and on the surface of the particles. From the perspective of properly compensating for the inadequate polishing capability of the magnetic layer, the Al desirably at least adheres to the surface of the particles.

Methods of obtaining ferromagnetic hexagonal ferrite particles with surfaces to which Al adheres can be divided roughly into methods of obtaining particles to which Al adheres in the process of preparing hexagonal ferrite, and methods of adhering an Al compound to the surface of particles that have been prepared. An example of the latter type of method is described in Japanese Unexamined Patent Publication (KOKAI) Heisei No. 9-213513 in paragraph 0036 in Example in the form of the method of coating $Al_2O_3$ on the surface of the particles by means of a coating treatment of aluminum salt in solution and an oxidation treatment by heating.

The Al compound adhering to the surface of the particles in the latter above methods is normally present in the form of a nonmagnetic material. By contrast, methods of obtaining particles to which Al adheres in a process of preparing hexagonal ferrite permit further enhancement of electromagnetic characteristics. The present inventor assumes that this is because the presence of Al in the process of preparing hexagonal ferrite allows the Al to be present on the surface of the particles in a way that contributes to enhancing electromagnetic characteristics.

An example of the former methods is the method of preparing ferromagnetic hexagonal ferrite powder by the glass crystallization method using a mixture of starting materials containing Al. Details are given in Japanese Unexamined Patent Publication (KOKAI) No. 2011-225417. Specifically, reference can be made to paragraphs 0013 to 0024 and to the description of Examples. The mixture of starting materials in the glass crystallization method contains glass-forming components and hexagonal ferrite-forming components. The Al compound that is added to the mixed starting materials so that Al will adhere to the surface of the particles is desirably one that is contained in the mixture of starting materials as a glass-forming component, as described in Japanese Unexamined Patent Publication (KOKAI) No. 2011-225417, paragraph 0017. Based on the method described in the above-cited publication, it is possible to obtain ferromagnetic hexagonal ferrite powder to which Al adheres, not to an aggregate of particles, but to the surface of primary particles of hexagonal ferrite.

From the perspective of achieving higher density recording, the average plate diameter of the ferromagnetic hexagonal ferrite powder is desirably equal to or more than 10 nm and equal to or less than 50 nm as the hexagonal plate diameter. When reproduction is conducted with a magnetoresistive head, it is desirable to keep noise down so the plate diameter is desirably equal to or less than 40 nm. When the plate diameter is within the above range, stable magnetization without thermal fluctuation can be anticipated. The low noise can also lend itself to high density magnetic recording.

The average particle size can be measured by the following method.

The particles are photographed at 100,000-fold magnification with a model H-9000 transmission electron microscope made by Hitachi and printed on photographic paper at an overall magnification of 500,000-fold to obtain a particle photograph. The targeted particles are selected in the particle photograph, the contours of the particles are traced with a digitizer, and the particle size is measured with KS-400 Carl Zeiss image analysis software. The size of 500 particles is measured and the average value of the particle size is adopted as the average particle size of the ferromagnetic powder.

In the present invention, the size of the particles or powder of ferromagnetic powder or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above. The term "primary particle" refers to an independent particle that has not aggregated.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in particle size definition (1) above, the average particle size refers to the average major axis length. For definition (2) above, the average particle size refers to the average plate diameter, with the arithmetic average of (maximum major diameter/thickness or height) being referred to as the average plate ratio. For definition (3), the average particle size refers to the average diameter (also called the average particle diameter).

Forming the Magnetic Layer

In the process of manufacturing the magnetic recording medium according to an aspect of the present invention, an abrasive liquid and a magnetic liquid that have been separately dispersed are desirably mixed to prepare a coating material for forming the magnetic layer, which is then used to form the magnetic layer. The magnetic liquid that is mixed with the abrasive liquid contains at least ferromagnetic powder, solvent, and binder. As needed, it can further comprise known additives that are commonly employed in particulate magnetic recording media.

Examples of additives that can be employed to prepare the magnetic layer coating material are lubricants, dispersing agents, dispersion adjuvants, antifungal agents, antistatic agents, oxidation inhibitors, carbon black, and solvents. For specific details, reference can be made to Japanese Unexamined Patent Publication (KOKAI) No. 2009-96798, which is expressly incorporated herein by reference in its entirety, paragraphs 0111 to 0115 and 0117 to [0121], for example. A curing agent for increasing the coating strength of the magnetic layer can be employed in preparing the coating material for forming the magnetic layer. Reference can be made to Japanese Unexamined Patent Publication (KOKAI) No. 2009-96798, paragraphs 0093 and 0094, for example, for details on curing agents that can be employed. The curing agent can be added during preparation of the magnetic liquid, simultaneously with mixing the magnetic liquid and the abrasive liquid, or to the mixture that is subsequently prepared.

The concentration of the solid component in the magnetic liquid is desirably about 10 weight percent to 50 weight percent from the perspective of facilitating dispersion of the particulate substance (ferromagnetic power and the like) in the magnetic liquid and preparation of the magnetic liquid. The binder that is employed to prepare the magnetic liquid and the binder that is employed to prepare the coating liquid for forming the nonmagnetic layer can be in the form of conventionally known thermoplastic resins, thermosetting resins, reactive resins, and mixtures thereof, for example. For details in this regard, reference can be made to Japanese Unexamined Patent Publication (KOKAI) No. 2009-54270, which is expressly incorporated herein by reference in its entirety, paragraphs 0044 to 0049, for example. The quantity of binder that is added is desirably 5 weight parts to 30 weight parts per 100 weight parts of ferromagnetic powder in the magnetic layer, and desirably 10 weight parts to 20 weight parts per 100 weight parts of nonmagnetic powder in the nonmagnetic layer. As set forth above, a curing agent such as a polyisocyanate compound can be employed together with the binder in the coating material for forming the magnetic layer. The same applies to the coating material for forming the nonmagnetic layer. The quantity of curing agent employed can be suitably determined.

The magnetic liquid can be prepared by mixing the above components in a known stirrer or disperser such as a disper or sand mill. The magnetic liquid that has been prepared can be mixed with the above-described abrasive liquid. When considering the fill rate and abrasiveness of the ferromagnetic powder in the magnetic layer that is formed, the magnetic liquid and abrasive liquid are desirably mixed so as to yield 1 weight part to 20 weight parts of abrasive per 100 weight parts of ferromagnetic powder. From the perspective of the dispersion and dispersion stability of the abrasive in the coating material for forming the magnetic layer, the magnetic liquid and the abrasive liquid are desirably mixed so as to yield 2,300 weight parts to 120,000 weight parts of solvent per 100 weight parts of abrasive. Optional components such as the above additives and curing agents can be added during or after mixing of the magnetic liquid and the abrasive liquid. Conducting ultrasonic dispersion, sand mill dispersion, or the like after mixing the magnetic liquid and abrasive liquid makes it possible to obtain a magnetic liquid for forming the magnetic layer in which particulate substances including the abrasive and ferromagnetic powder are dispersed to a high degree.

In the magnetic recording medium according to an aspect of the present invention, the magnetic layer can contain nonmagnetic particles other than the abrasive. Such nonmagnetic particles can enhance the friction characteristics (lower the coefficient of friction) of the magnetic layer surface, thereby contributing to maintaining running durability. To fully develop such effect, the use of nonmagnetic particles of larger particle size and a lower Mohs hardness than those of the abrasive is desirable. The average particle diameter of such nonmagnetic particles is desirably 50 nm to 200 nm. The average particle diameter of the above nonmagnetic particles is the value determined by the method described in paragraph 0015 of Japanese Unexamined Patent Publication (KOKAI) No. 2011-48878, which is expressly incorporated herein by reference in its entirety. From the perspective of dispersion, the use of colloidal particles is desirable and the use of inorganic oxide colloidal particles is preferred. For details, reference can be made to paragraph 0023 in Japanese Unexamined Patent Publication (KOKAI) No. 2011-48878. From the perspective of the availability of monodispersed colloidal particles, the use of silica colloidal particles (colloidal silica) as nonmagnetic particles is of particular preference.

The content of the nonmagnetic particles in the magnetic layer is not particularly limited and can be set to within a range over which good electromagnetic characteristics and frictional characteristics can be both obtained. It is desirably 0.5 weight part to 5 weight parts, preferably 1 weight part to 3 weight parts, per 100 weight parts of ferromagnetic powder.

When the abrasive and ferromagnetic powder are simultaneously dispersed and mixed, the nonmagnetic particles can be admixed at any stage. When the abrasive liquid and magnetic liquid are separately dispersed, the nonmagnetic particles can be added to at least either the magnetic liquid or the abrasive liquid. From the perspective of forming a magnetic layer in which the abrasive, ferromagnetic powder, and nonmagnetic particles are each well dispersed, it is desirable to prepare a nonmagnetic liquid containing the nonmagnetic particles separately from the magnetic liquid and abrasive liquid, and then admix it to the abrasive liquid and magnetic liquid. For preparation of such a nonmagnetic liquid, reference can be made to Japanese Unexamined Patent Publication (KOKAI) No. 2011-48878, paragraphs 0022 and 0024 to 0027.

The magnetic recording medium according to an aspect of the present invention can comprise a nonmagnetic layer containing nonmagnetic powder and binder between the nonmagnetic support and the magnetic layer. For details regarding the nonmagnetic powder that is employed in the nonmagnetic layer, reference can be made to Japanese Unexamined Patent Publication (KOKAI) No. 2011-48878, paragraph 0046. The average particle size of the nonmagnetic powder desirably falls within the range of 5 nm to 50 nm set forth above. The specific surface area of the nonmagnetic powder is desirably 1 $m^2$/g to 100 $m^2$/g, preferably 5 $m^2$/g to 80 $m^2$/g, and more preferably, 10 $m^2$/g to 75 $m^2$/g. Known additives can be employed in the nonmagnetic layer.

The binder resins, lubricants, dispersing agents, additives, solvents, and dispersion methods of the magnetic layer can be applied to the nonmagnetic layer. In particular, known techniques relating to the magnetic layer can be applied to the quantities and types of binder resin and the quantities added and types of additives and dispersing agents. The nonmagnetic layer of the magnetic recording medium according to an aspect of the present invention can contain carbon black. The details are as set forth above.

Examples of nonmagnetic supports that can be employed are known supports such as biaxially-oriented polyethylene terephthalate, polyethylene naphthalate, polyamide, polyamide-imide, and aromatic polyamides. Of these, polyethylene terephthalate, polyethylene naphthalate, and polyamides are desirable.

These supports can be subjected to corona discharge, plasma treatment, adhesion-promoting treatment, heat treatment, and the like. The surface roughness of nonmagnetic supports that can be employed is desirably a center average roughness Ra of 3 nm to 10 nm at a cutoff value of 0.25 mm.

In addition to the above layers, the magnetic recording medium according to an aspect of the present invention can comprise one or more optional layer such as a backcoat layer or the like that can be formed in a particulate magnetic recording medium.

In the magnetic recording medium according to an aspect of the present invention, the thickness of the nonmagnetic support is desirably 3 μm to 10 μm. The thickness of the backcoat layer is, for example, 0.1 μm to 1.0 μm, desirably 0.2 μm to 0.8 μm.

The thickness of the magnetic layer and the thickness of the nonmagnetic layer in the magnetic recording medium according to an aspect of the present invention are as set forth above. The nonmagnetic layer in the magnetic recording medium according to an aspect of the present invention will produce its effect so long as it is substantially nonmagnetic. For example, it can contain impurities or unintended trace quantities of magnetic material and can still exhibit the effect of the present invention and be deemed to have substantially the same structure as the magnetic recording medium according to an aspect of the present invention. The term "substantially the same" means a nonmagnetic layer with a residual magnetic flux density of equal to or less than 10 mT (100 G), or a coercive force of equal to or less than 7.96 kA/m (100 Oe), desirably no residual magnetic flux density or coercive force.

In preparing the coating materials for forming the various layers such as the magnetic layer and nonmagnetic layer, reference can be made to Japanese Unexamined Patent Publication (KOKAI) No. 2011-48878, paragraphs 0055 and 0056. Preparation of the coating material for forming the magnetic layer and preparation of the abrasive liquid, magnetic liquid, and the like are as set forth above.

A coating apparatus in the form of an air doctor coater, blade coater, road coater, extrusion coater, air knife coater, squeeze coater, dip coater, reverse roll coater, transfer roll coater, gravure coater, kiss coater, cast coater, spray coater, spin coater, or the like can be employed to apply the magnetic layer coating material, nonmagnetic layer coating material, and backcoat layer coating material. In this regard, reference can be made to the "Most Recent Coating Technologies" (31 May 1983) published by the United Engineering Center, which is expressly incorporated herein by reference in its entirety, for example. Following the coating step, the medium can be subjected to various post processing, such as processing to orient the magnetic layer, surface smoothing treatment (calendering treatment), and heat treatment. The post processing can be conducted by known methods.

Normally, a magnetic recording medium in the form of a tape (magnetic tape) is subjected to a heat treatment to improve dimensional stability to the use environment and promote curing of the magnetic layer, backcoat layer, and the like to which thermosetting curing agents have been added. The temperature of the heat treatment is desirably suitably adjusted based on the objective, and can range from 50° C. to 80° C., for example.

The magnetic recording medium obtained can be cut to desired size for use with a cutting apparatus, stamper, or the like.

The magnetic recording medium according to an aspect of the present invention as set forth above can exhibit good electromagnetic characteristics due to the presence of abrasive in the form of extremely fine particles in the magnetic layer, as well as capable of exhibiting good running durability and good running stability. The magnetic recording medium according to an aspect of the present invention is suitable as a high-capacity data backup tape that is required to permit highly reliable use for long periods.

A further aspect of the present invention relates to a method of manufacturing the magnetic recording medium according to an aspect of the present invention. The manufacturing method comprises:

preparing a coating material for forming a magnetic layer by mixing:

a magnetic liquid comprising an organic solvent and ferromagnetic hexagonal ferrite powder containing 3 weight percent to 12 weight percent of Al, based on $Al_2O_3$ conversion, relative to 100 weight percent of the total weight of the powder, and an abrasive liquid comprising abrasive, an organic solvent, and an aromatic hydrocarbon compound comprising at least one phenolic hydroxyl group (but comprising substantially no ferromagnetic hexagonal ferrite powder); and coating on a nonmagnetic support the coating material for forming the magnetic layer that has been prepared to form a magnetic layer.

The details are as set forth above.

EXAMPLES

The present invention will be described in detail below based on Examples. However, the present invention is not limited to Examples. The terms "parts" and "percent" given in Examples are weight parts and weight percent unless specifically stated otherwise.

Preparation Example 1

Al-Adhered Hexagonal Ferrite

The quantity of the Al adhering was adjusted by varying the quantity of $AlCl_3$ added to a slurry in the method described in Japanese Unexamined Patent Publication (KOKAI) Heisei No. 9-213513, paragraph 0036, on the surface of ferromagnetic hexagonal barium ferrite powder prepared by a known method or obtained commercially to prepare ferromagnetic hexagonal barium ferrite powder comprised of particles with surfaces adhered with $Al_2O_3$.

Preparation Example 2

Al-Adhered Hexagonal Ferrite

Using the method described in Example 1 of Japanese Unexamined Patent Publication (KOKAI) No. 2011-225417, the quantity of $Al_2O_3$ added to the starting material mixture was varied to adjust the quantity of the Al adhering to prepare ferromagnetic hexagonal barium ferrite powder comprised of particles that were surface-adhered with $Al_2O_3$.

Examples 1 to 6, Comparative Examples 1 to 6

1. Preparation of Alumina Dispersion Product

To 100 weight parts of alumina powder with an alpha-conversion ratio of about 65 percent and a specific surface area of 30 $m^2/g$ by the BET method (HIT-70, made by Sumitomo Chemical Co., Ltd.) or alumina powder with a specific surface area of 20 $m^2/g$ by the BET method (HIT-80, made by Sumitomo Chemical Co., Ltd.) were admixed the quantity of 2,3-dihydroxynaphthalene (made by Tokyo Chemical) indicated in Table 1; 31.3 weight parts of a 32 percent solution (the solvent was a mixed solvent of methyl ethyl ketone and toluene) of polyester polyurethane resin comprising $SO_3Na$ groups as polar groups (UR-4800, made by Toyobo (polar group quantity: 80 meq/kg)); and solvent in the form of 570 parts of a 1:1 (w/w) mixed solution of methyl ethyl ketone and cyclohexanone. The mixture was dispersed for the period indicated in Table 1 in a paint shaker in the presence of zirconia beads. Following dispersion, the dispersion and the beads were separated by means of a mesh, yielding an alumina dispersion.

2. Formula of Magnetic Layer Coating Material

| (Magnetic liquid) | |
| --- | --- |
| Ferromagnetic hexagonal barium ferrite powder (see Table 1) | 100 parts |
| Polyurethane resin comprising SO$_3$Na groups (Molecular weight: 70,000; SO$_3$Na groups: 0.2 meq/g) | 14 parts |
| Cyclohexanone | 150 parts |
| Methyl ethyl ketone | 150 parts |
| (Abrasive liquid) | |
| Alumina dispersion prepared in 1. above | 6 parts |
| (Silica sol) | |
| Colloidal silica (average particle size 100 nm) | 2 parts |
| Methyl ethyl ketone | 1.4 parts |
| (Other components) | |
| Stearic acid | 2 parts |
| Butyl stearate | 6 parts |
| Polyisocyanate (Coronate, made by Nippon Polyurethane Industry Co., Ltd.) | 2.5 parts |
| (Finishing solvent added) | |
| Cyclohexanone | 200 parts |
| Methyl ethyl ketone | 200 parts |

3. Formula of Nonmagnetic Layer Coating Material

| Nonmagnetic inorganic powder: α-iron oxide | 100 parts |
| --- | --- |
| Average major axis length: 10 nm | |
| Average acicular ratio: 1.9 | |
| Specific surface area by BET method: 75 m$^2$/g | |
| Carbon black | 20 parts |
| Average particle size: 20 nm | |
| Polyurethane resin comprising SO$_3$Na groups (Molecular weight: 70,000; SO$_3$Na groups: 0.2 meq/g) | 18 parts |
| Stearic acid | 1 part |
| Cyclohexanone | 300 parts |
| Methyl ethyl ketone | 300 parts |

4. Formula of Backcoat Layer Coating Material

| Nonmagnetic inorganic powder: α-iron oxide | 80 parts |
| --- | --- |
| Average major axis length: 0.15 μm | |
| Average acicular ratio: 7 | |
| Specific surface area by BET method: 52 m$^2$/g | |
| Carbon black | 20 parts |
| Average particle size: 20 nm | |
| Vinyl chloride copolymer | 13 parts |
| Polyurethane resin comprising sulfonate groups | 6 parts |
| Phenylphosphonic acid | 3 parts |
| Cyclohexanone | 155 parts |
| Methyl ethyl ketone | 155 parts |
| Stearic acid | 3 parts |
| Butyl stearate | 3 parts |
| Polyisocyanate | 5 parts |
| Cyclohexanone | 200 parts |

5. Preparation of Coating Materials for Forming Various Layers

The above magnetic liquid was dispersed for 24 hours (bead dispersion) in a batch-type vertical sand mill. A dispersion medium in the form of 0.5 mm φ zirconia beads was employed. Using the sand mill, the magnetic liquid and the abrasive liquid that had been prepared were mixed with the other components (silica sol, other components, and finishing solvent added) and the mixture was bead dispersed for 5 minutes. Subsequently, the mixture was processed for 0.5 minutes in a batch-type ultrasonic device (20 kHz, 300 W). Filtering was then conducted with a filter having an average pore size of 0.5 μm, yielding a magnetic layer coating material.

For the nonmagnetic layer coating material, the various components were dispersed for 24 hours in a batch-type vertical sand mill. A dispersion medium in the form of 0.1 mm φ zirconia beads was employed. The dispersion obtained was filtered using a filter with an average pore size of 0.5 μm to prepare a nonmagnetic layer coating material.

For the backcoat layer coating material, all the components except for the lubricants (stearic acid and butyl stearate), the polyisocyanate, and 200 parts of the cyclohexanone were kneaded and diluted in an open kneader. The mixture was then dispersed by conducting 12 passes through a horizontal bead mill disperser using 1 mm φ zirconia beads at a bead fill rate of 80 percent and a rotor tip peripheral speed of 10 m/s, the residence time of each pass being two minutes. Subsequently, the remaining components were added to the dispersion and the mixture was stirred in a dissolver. The dispersion obtained was filtered through a filter having an average pore size of 1 μm to prepare the backcoat layer coating material.

6. Fabrication of Magnetic Tape

The nonmagnetic layer coating material prepared in 5. above was coated and dried to a thickness of 100 nm on the surface of a polyethylene naphthalate support 5 μm in thickness (Young's modulus in width direction: 8 GPa, Young's modulus in longitudinal direction: 6 GPa). Subsequently, the magnetic layer coating material prepared in 5. above was coated in a quantity calculated to yield a dry thickness of 70 nm thereover. While the magnetic layer coating material was still wet, a magnetic field with a field strength of 0.3 T was applied perpendicularly to the coating surface in a perpendicular orientation treatment, after which drying was conducted. Subsequently, the backcoat layer coating material prepared in 5. above was coated and dried to a thickness of 0.4 μm on the opposite side of the support.

Subsequently, a calender comprised of all metal rolls was used to conduct a surface smoothing treatment at a temperature of 100° C., a linear pressure of 300 kg/cm, and a speed of 100 m/minute. The product was then heat treated for 36 hours in a dry environment at 70° C. Following the heat treatment, the product was slit to ½ inch width to obtain a magnetic tape.

Evaluation Methods

1. Al Content in Particles

A 0.01 g quantity of the ferromagnetic hexagonal ferrite powder employed in Examples and Comparative Examples that is shown in Table 1 was immersed in 10 mL of a 4 N—HCl solution and heated for 3 hours at 80° C. on a hot plate to dissolve it. The solution was diluted, after which the Fe and Al were quantified by ICP to determine the Al content based on $Al_2O_3$ conversion relative to the total quantity of particles.

When the cross section of particles of the ferromagnetic hexagonal barium ferrite powder that was prepared in Preparation Example 2 and employed in Examples and Comparative Examples was observed by high resolution TEM (transmission electron microscope, the formation of a coating on the surface was confirmed. When the Al/Fe ratio at a depth of about 0.5 nm from the surface of the particles was measured by X-ray photoemission spectroscopic (XPS) analysis in the ferromagnetic hexagonal barium ferrite powder, a value of 1.5 to 2.0-fold the value measured by ICP above was obtained, confirming the localized presence of Al on the surface. Based on these results, the ferromagnetic hexagonal barium ferrite powder prepared in Preparation Example 2 above was determined to have particles the surface to which Al adhered. The fact that the coating was formed on primary particles of the ferromagnetic hexagonal barium ferrite powder was confirmed by the above TEM observation.

2. Status of Presence of Abrasive in Magnetic Layer

The maximum plan view surface area of the abrasive confirmed in a region 4.3 μm high×6.3 μm long of the magnetic layer was determined by the above-described method.

The upper image in FIG. 1 shows a binary-processed SEM image of Comparative Example 1 and the lower image shows the same for Example 1. A comparison of the two images reveals that the maximum plan view surface area of the abrasive as determined for a rectangular region of 4.3 μm×6.3 μm of the magnetic layer by a scanning electron microscope was less than 0.06 percent of the total surface area (100 percent) of the region, indicating that the abrasive was present in the form of extremely fine particles.

3. Evaluation of Electromagnetic Characteristics (SNR)

Using a reel tester, read head (track width 1 μm, gap 200 nm), and write head (Bs=1.8 T), a signal with a recording density of 250 kfci in the longitudinal direction of the tape was recorded and reproduced. Subsequently, the reproduction signal and noise spectra from the tape were measured with a spectral analyzer and the ratio of the reproduction signal to the noise (SNR) was determined A SNR exceeding 0 dB as determined by the above method indicated good electromagnetic characteristics.

4. Evaluation of Running Stability (PES (Positional Error Signal))

The tape was run on a reel tester and the servo signal from the tape was picked up and analyzed by a digital storage oscilloscope to determine the amount by which a magnetic recording head of standard LTO G5 was unable to track due to vertical movement of the tape. The PES as measured by the above method is a value affected by the running stability and SNR. The lower the value, the better the running stability indicated.

5. Evaluation 1 of Running Durability (Head Abrasion)

The abrasion width of an AlFeSil square bar was measured when the magnetic tape was run under the running conditions given below in an environment of 23° C. and 50 percent RH. An abrasion width falling within a range of equal to or more than 20 μm and equal to or less than 50 μm indicates the presence on the magnetic layer surface of abrasive in a form suitable for ensuring good running stability without a large amount of abrasion.

<Running Conditions>

The surface of the magnetic layer of the magnetic tape was brought into contact at a lapping angle of 12 degrees with the edge of an AlFeSil square bar in a direction perpendicular to the longitudinal direction of the AlFeSil square bar (the square bar specified by ECMA-288/Annex H/H2). In this state, a 580 m length of the magnetic tape was run back and forth 50 times at a speed of 3 m/s and a tension of 1.0 N.

6. Evaluation 2 of Running Durability (Output Variation)

Using a reel tester, the output of the first pass of tape running and the output of the tape after having been run back and forth 10,000 times were measured with a spectral analyzer and the difference was calculated. When the value obtained by the above method was equal to or less than −3 dB, it was evaluated as B; otherwise, it was evaluated as A.

The results of the above evaluation are given in Table 1.

TABLE 1

| | Ferromagnetic powder | | Specific surface area $S_{BET}$ ($m^2/g$) | Dispersion time with beads | Quantity of 2,3-dihydroxy-naphthalene | Maximum plan view surface area of abrasive | SNR (dB) | Output variation | Head abrasion (μm) | PES (nm) |
|---|---|---|---|---|---|---|---|---|---|---|
| | Preparation method | Al content (based on $Al_2O_3$ conversion) | | | | | | | | |
| Ex. 1 | Preparation Ex. 1 | 3% | 20 | 5 | 3 | Less than 0.06% | +1.3 | A | 25 | 35 |
| Ex. 2 | Preparation Ex. 2 | 3% | 20 | 30 | 0 | Less than 0.06% | +1.6 | A | 25 | 35 |
| Ex. 3 | Preparation Ex. 2 | 6% | 20 | 5 | 3 | Less than 0.06% | +1.9 | A | 30 | 30 |
| Ex. 4 | Preparation Ex. 2 | 9% | 20 | 30 | 0 | Less than 0.06% | +1.8 | A | 35 | 20 |
| Ex. 5 | Preparation Ex. 2 | 12% | 20 | 5 | 3 | Less than 0.06% | +2.0 | A | 40 | 10 |
| Ex. 6 | Preparation Ex. 1 | 12% | 20 | 5 | 3 | Less than 0.06% | +1.0 | A | 40 | 10 |
| Comp. Ex. 1 | Preparation Ex. 1 | 2% | 20 | 5 | 0 | 0.06% | −0.3 | B | 20 | 60 |
| Comp. Ex. 2 | Preparation Ex. 1 | 10% | 30 | 5 | 0 | 0.06% | −0.5 | A | 50 | 40 |
| Comp. Ex. 3 | Preparation Ex. 1 | 6% | 30 | 5 | 0 | 0.06% | 0 | A | 35 | 45 |
| Comp. Ex. 4 | Preparation Ex. 2 | 6% | 30 | 5 | 0 | 0.06% | +0.3 | A | 35 | 45 |

TABLE 1-continued

| | Ferromagnetic powder | | Specific | | Quantity | Maximum | | | | |
|---|---|---|---|---|---|---|---|---|---|---|
| | Preparation method | Al content (based on Al$_2$O$_3$ conversion) | surface area S$_{BET}$ (m$^2$/g) | Dispersion time with beads | of 2,3-dihydroxy-naphthalene | plan view surface area of abrasive | SNR (dB) | Output variation | Head abrasion (μm) | PES (nm) |
| Comp. Ex. 5 | Preparation Ex. 1 | 2% | 20 | 5 | 3 | Less than 0.06% | +1.0 | B | 12 | 45 |
| Comp. Ex. 6 | Preparation Ex. 1 | 13% | 20 | 30 | 0 | Less than 0.06% | +0.7 | A | 50 | 30 |

Evaluation Results

The maximum plan view surface area of Examples was less than 0.06 percent; the maximum value among the values of Examples was 0.05 percent. By contrast, the maximum plan view surface area in Comparative Examples 2 to 4 was 0.06 percent, as indicated in Table 1. Based on the results given in Table 1, it was determined that a magnetic recording medium with good electromagnetic characteristics, running durability, and running stability was obtained when ferromagnetic hexagonal ferrite powder containing 3 weight percent to 12 weight percent of Al based on Al$_2$O$_3$ conversion relative to the total 100 weight percent was employed as the ferromagnetic powder of the magnetic layer and an abrasive was present in the magnetic layer in the form of extremely fine particles such that the maximum plan view surface area of the abrasive as determined for a rectangular region 4.3 μm×6.3 μm of the magnetic layer by a scanning electron microscope was less than 0.06 percent.

A comparison of Examples reveals that Examples in which the Al-containing ferromagnetic hexagonal ferrite powder that was prepared in Preparation Example 2 was employed exhibited a better SNR than Examples in which the Al-containing ferromagnetic hexagonal ferrite powder prepared in Preparation Example 1 was employed. It was presumed that in Preparation Example 2, hexagonal ferrite in which Al adhered to the particles in the form of fine particles was obtained, contributing to enhancing the SNR.

The magnetic recording medium according to an aspect of the present invention is suitable as a magnetic recording medium for high density recording, such as a high-capacity backup tape.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a magnetic layer comprising ferromagnetic powder and binder on a nonmagnetic support, wherein
    the ferromagnetic powder is ferromagnetic hexagonal ferrite powder comprising 3 weight percent to 12 weight percent of Al, based on Al$_2$O$_3$ conversion, relative to 100 weight percent of the total weight of the powder,
    the magnetic layer further comprises abrasive and an aromatic hydrocarbon compound comprising a phenolic hydroxyl group,
    the maximum plan view surface area of the abrasive as determined for a 4.3 μm×6.3 μm rectangular region of the magnetic layer by a scanning electron microscope is less than 0.06 percent relative to 100 percent of the total surface area of the region, and
    the specific surface area of the abrasive by the BET method ranges from 14 m$^2$/g to 40 m$^2$/g.

2. The magnetic recording medium according to claim 1, wherein the abrasive is alumina.

3. The magnetic recording medium according to claim 1, wherein the aromatic hydrocarbon compound comprising a phenolic hydroxyl group is denoted by formula (1) below:

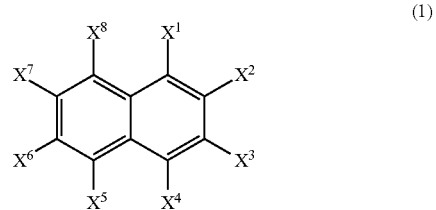

(1)

wherein, in formula (1), two from among X$^1$ to X$^8$ denote hydroxyl groups and each of the others from among X$^1$ to X$^8$ independently denotes a hydrogen atom or a substituent.

4. The magnetic recording medium according to claim 1, wherein the aromatic hydrocarbon compound comprising a phenolic hydroxyl group is selected from the group consisting of dihydroxynaphthalene and derivatives thereof.

5. The magnetic recording medium according to claim 1, wherein Al adheres to a surface of the ferromagnetic hexagonal ferrite powder.

6. The magnetic recording medium according to claim 1, wherein the ferromagnetic hexagonal ferrite powder is ferromagnetic hexagonal ferrite powder comprising more than 8 weight percent and equal to or less than 12 weight percent of Al, based on $Al_2O_3$ conversion, relative to 100 weight percent of the total weight of the powder.

7. The magnetic recording medium according to claim 1, wherein the ferromagnetic hexagonal ferrite powder is ferromagnetic hexagonal ferrite powder that has been obtained by a glass crystallization method using a mixture of starting materials comprising Al.

* * * * *